United States Patent [19]

Iwashita et al.

[11] 3,923,751

[45] Dec. 2, 1975

[54] PROCESS FOR PREPARING POLYAMINO ACID IN A NON-POLAR SOLVENT

[75] Inventors: Yuji Iwashita, Kawasaki; Mitsuru Sakuraba, Tokyo, both of Japan

[73] Assignee: Ajinomoto Co., Inc., Tokyo, Japan

[22] Filed: Dec. 26, 1973

[21] Appl. No.: 427,695

[30] Foreign Application Priority Data
Dec. 26, 1972 Japan.................................. 48-3170
Aug. 23, 1973 Japan................................ 48-94583

[52] U.S. Cl....... 260/78 A; 117/124 E; 260/29.2 N; 260/31.2 N; 260/33.6 R; 260/33.8 R
[51] Int. Cl.$^2$.......................................... C08G 69/10
[58] Field of Search.................................. 260/78 A

[56] References Cited
UNITED STATES PATENTS

| | | | |
|---|---|---|---|
| 2,174,527 | 10/1939 | Peterson........................... | 260/78 A |
| 3,329,653 | 7/1967 | Beavers et al............... | 260/78 A UX |
| 3,819,587 | 6/1974 | Kwoleck........................ | 260/32.6 N |

OTHER PUBLICATIONS

J. Am. Chem. Soc. 76, 2814–2816, Frankel et al., (1954).

J. of Organic Chemistry, Vol. 21, 1531–1532, Linschitz et al., (1956).

Primary Examiner—Howard E. Schain
Attorney, Agent, or Firm—Oblon, Fisher, Spivak, McClelland & Maier

[57] ABSTRACT

Polyamino acids are prepared by an improved process by polymerizing an amino acid halide salt such as an amino acid chloride hydrochloride or an amino acid bromide hydrobromide in a non-polar organic solvent which contains no active hydrogen atoms in the absence of a base at elevated temperatures.

5 Claims, No Drawings

PROCESS FOR PREPARING POLYAMINO ACID IN A NON-POLAR SOLVENT

BACKGROUND OF THE INVENTION

1. Field of the Invention

The present invention relates to an improved process for preparing polyamino acids from amino acid halide hydrohalides.

2. Description of the Prior Art

Polyamino acids which have a high degree of polymerization possess excellent properties with respect to weather resistance, light resistance, heat resistance, moisture permeability and feel or texture. Also, the polyamino acids have been used as fibers, films, coating materials for synthetic leather and for medical uses.

In general, polyamino acids have been prepared by polymerizing amino acid-N-carboxy anhydrides which are derived from the reaction between an amino acid and phosgene. However, despite the prior art methods, it has been difficult to obtain polymers which are of a high degree of polymerization.

Among the other prior art processes for preparing polyamino acids without employing amino acid-N-carboxy anhydride, is the procedure of polymerizing an amino acid chloride hydrochloride which is a type of amino acid halide salt. Although this process has the advantage that it is applicable in cases where N-carboxy anhydrides cannot be obtained as with β-amino acids, earlier attempts in using this procedure have resulted in the formation of oligopeptides having a low degree of polymerization.

Thus, this method is not particularly attractive. For example, M. Frankel et al have attempted to polymerize amino acid chloride hydrochlorides such as α-alanyl chloride hydrochloride, β-alanyl chloride hydrochloride, glycyl chloride hydrochloride and leucyl chloride hydrochloride by heating the salts at 115°–180°C under a high vacuum in the absence of a solvent or by dissolving the salt in a polar solvent such as dimethylformamide which contains triethylamine and allowing it to stand at room temperature for a long time. In either case however, oligopeptides of the amino acids are only obtained which have a polymerization degree of about 10 to 20 (J.Am.Chem.Soc., 76, 2814–2816 (1954).

A need, therefore continues to exist for a process by which amino acids can be polymerized to give polymers having a high degree of polymerization.

SUMMARY OF THE INVENTION

Accordingly, one object of the present invention is to provide a method for polymerizing amino acids with a high degree of polymerization.

Briefly, this object and other objects of the invention as hereinafter will become more readily apparent can be attained by a process of preparing a polyamino acid by polymerizing an amino acid halide salt such as an amino acid chloride hydrochloride or an amino acid bromide hydrobromide wherein the improvement comprises polymerizing the amino acid halide salt in a non-polar solvent which contains no active hydrogen atoms in the absence of a base at elevated temperatures.

DESCRIPTION OF THE PREFERRED EMBODIMENTS

The term "polyamino acid having a high degree of polymerization" is indicative of a polymer which has an intrinsic viscosity [η] above 0.4, when [η] is measured at 30°C in a trifluoroacetic acid solution. Polyamino acids of this viscosity may be shaped into fibers or films.

The formation of polyamino acids by polymerization of an amino acid halide salt is an elimination reaction of hydrogen halide as shown by the following equation. In view of the evolution of hydrogen halide in the reaction, it would seem desirable to remove the liberated hydrogen halide as quickly as possible from the reaction system in order to obtain a polyamino acid having a high degree of polymerization.

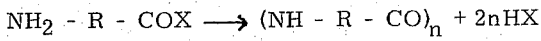

$$NH_2 - R - COX \longrightarrow (NH - R - CO)_n + 2nHX$$
$$\cdot HX$$

Of course, in the reaction above, R is an organic radical and X is chlorine or bromine.

When the hydrogen halide which is evolved in the above reaction is quickly removed from the reaction medium by means of high vacuum or by neutralization with an organic base in an organic solvent as is practiced in the prior art procedures, the type of reaction which tends to predominate is the initiation of the polymerization reaction rather than the steady growth of added amino acid monomers to form a polymer chain. Consequently, the preference for the formation of oligomers of the amino acids which have a low degree of polymerization or the formation of diketopiperazine derivatives (a dimer of the amino acid) predominates. Furthermore, when the reaction is conducted in a polar solvent such as dimethylformamide, the evolved hydrogen halide dissolves in the solvent, and acts as polymerization inhibitor thus preventing the formation of polymers having a high degree of polymerization.

In the process of the present invention the evolved hydrogen halide does not dissolve in a non-polar solvent, and hence the polymerization reaction proceeds smoothly. Also, since no base exists in the reaction system, the compulsory removal of the hydrogen halide from solution does not occur. Thus, the type of reaction which promotes the initiation of the polymerization of the amino acid does not predominate or is minimized. Thus, polyamino acids can be formed which have a high degree of polymerization. Also, very little polymerization of the amino acid occurs when the amino acid is heated in a polar solvent in the absence of base. Even if some polymerization occurs under these conditions, only oligopeptides having a low degree of polymerization are obtained.

Thus, the use of a non-polar organic solvent as a reaction medium and the absence of base in the reaction medium are important conditions which promote the formation of polyamino acids having a high degree of polymerization by heating amino acid halide salts in an organic solvent.

The amino acid halide salts which may be employed as monomers in the present invention can be readily prepared, for example, by reacting an amino acid with phosphorus pentachloride or phosphorus pentabromide. Suitable amino acids include α-amino acids, β-amino acids, ω-amino acids and α-alkylamino acids. However, neutral amino acids such as glycine, alanine, β-alanine, valine, leucine, isoleucine, methionine, α-aminobutyric acid, phenylalanine, serine, threonine; acidic amino acids such as glutamic acid and aspartic acid; acidic amino acid-ω-esters such as γ-methyl glutamate, γ-ethyl glutamate and β-methyl aspartate; basic amino acids such as lysine and ornithine; N-derivatives of basic amino acids such as $N^{\omega}$-benzoyllysine, $N^{\delta}$-carbobenzoxyornithine; and O-derivatives of amino acids containing hydroxy groups such as O-benzylserine are especially preferred amino acids. The amino acids used can be optically active, racemic mixtures or mixtures thereof.

The amino acid halide salts can be employed singly or in mixtures thereof. Therefore, homopolymers or copolymers of the amino acids can be formed.

Non-polar solvents which are suitable as reaction media in the present process are those which do not possess an active hydrogen atom and which are inert to the amino acid halide salt monomers. Especially preferable non-polar solvents include those which have a dielectric constant below 4 at 20°C. Suitable solvents include aliphatic hydrocarbons such as hexane, heptane and octane; aromatic hydrocarbons such as benzene, toluene and xylene; aliphatic chlorinated hydrocarbons such as carbon tetrachloride, trichloroethylene, 1,1,1-trichloroethane, tetrachloroethylene and mixtures of these solvents. The non-polar solvents may also be employed without difficulty in admixture with polar solvents which do not possess active hydrogen atoms provided that the dielectric constant values of the solvent mixture is maintained below 4. By carefully selecting those solvents which are capable of dissolving the polymers produced which, of course is a function of the amino acid halide salt employed, the polymerization reaction can be optimized to yield polymers which have a high degree of polymerization. Similarly good results can also be obtained when the particular solvent chosen only partially dissolves the polymer. Usually it is desirable to use a solvent in which the concentration of polymer formed is above 0.05% by weight at ordinary temperatures.

In conducting the process of the present invention, an amino acid halide salt is dissolved or suspended in a non-polar solvent in a ratio of 0.5 – 50 ml of solvent per gram of amino acid halide salt. The mixture is heated at a temperature of from 40°C to the boiling point of the solvent employed. The preferred temperature is in the range of 50°C to 120°C. The polymerization reaction can be conducted at ordinary atmospheric pressures. However, somewhat reduced pressures of from 400 mm Hg up to atmospheric pressure can also be used in order to remove some of the generated hydrogen halide gas from the reaction system, if desired. The reaction time is not critical and can be varied depending on the reaction temperature employed. Normally, however, a time period of 4 hours to about 24 hours is suitable.

After completion of the polymerization reaction, if the polymer is totally soluble in the reaction medium, the polymer solution may be directly used as a "dope" for forming fibers or films. If desired, however, the polymer can be separated from solution by the addition of suitable non-solvents to the solution such as methanol, acetone and petroleum ether after removal of the solvent according to the demand.

Having generally described this invention, a further understanding can be obtained by reference to certain specific examples which are provided herein for purposes of illustration only and are not intended to be limiting unless otherwise specified.

EXAMPLE 1

Two gram quantities of L-leucyl chloride hydrochloride were heated at 65°C for 24 hours in 20 ml of various solvents. Each reaction mixture was added to 50 ml of methanol to precipitate the polymer which was separated by filtration and dried. The results obtained are summarized in Table 1.

TABLE 1

| Run No. | Solvent | Polymer yield (%) | $[\eta]^*$ | |
|---|---|---|---|---|
| 1 | Heptane | 97.9 | 1.53 | |
| 2 | Carbon tetrachloride | 98.1 | 2.83 | |
| 3 | Trichloroethylene | 100.0 | 1.10 | |
| 4 | Tetrachloroethylene | 98.6 | 1.80 | Fiber and film-forming |
| 5 | Methylchloroform | 87.6 | 0.81 | ability |
| 6 | Benzene | 99.4 | 1.10 | |
| 7 | Toluene | 99.2 | 1.72 | The present invention |
| 8 | Ethylacetate | 41.0 | 0.10 | |
| 9 | Acetonitrile | 51.6 | 0.10 | No fiber or film- Control |
| 10 | Dimethylformamide | ** | — | forming ability |

*indicates that the viscosity values were measured at 30°C in trifluoroacetic acid.
**indicates that the product is soluble in methanol and a polymer does not form.

As is apparent from the data in Table 1, polyamino acids having a high degree of polymerization can be obtained which are capable of forming fibers and films only by the use of non-polar solvents as a reaction medium.

REFERENCE EXAMPLE

Two grams of L-leucyl chloride hydrochloride were added to 20 ml of a solution of 1.95 g of triethylamine in toluene and were allowed to stand at room temperature for 48 hours. The reaction solution was concentrated to dryness under reduced pressure, and 50 ml of water was added to the residue to dissolve the triethylamine hydrochloride and to precipitate a polymer which was filtered and dried.

The yield of polymer was 28.0%. A sample of the polymer was dissolved in trifluoroacetic acid, and the intrinsic viscosity $[\eta]$ was measured at 30°C and was found to be 0.10. The polymer was obtained as a powder and no films could be formed from the polymer. A similar experiment was conducted at 60°C and very much the same results were obtained. Similarly, the polymer obtained could not be cast into a film.

EXAMPLE 2

A 20 gram amount of L-phenylalanyl chloride hydrochloride was added to 80 ml of toluene and was heated at 70°C for 18 hours. The reaction mixture was poured into 500 ml of methanol and the precipitated polyphenylalanine was filtered and dried. The yield of product was 98.8%. A sample of this polymer was dissolved in trifluoroacetic acid and [$\eta$] was measured at 30°C and was found to be 0.98.

A 10 gram amount of the polymer was dissolved in a mixed solvent consisting of 130 ml of chloroform and 10 ml benzene. The resultant solution was spread over a glass plate with an applicator having a slit width of 0.5 mm. The coated plate was dried at 80°C for 20 minutes. The film which was removed from the casting surface had a thickness of 18$\mu$, a tensile strength of 4.83 kg/mm$^2$, an elongation of 14% and a favorable touch.

EXAMPLE 3

A 40 gram amount of DL-leucyl chloride hydrochloride was added to 400 ml of tetrachloroethylene and was heated at 100°C for 8 hours with stirring while the reaction system was maintained under a reduced pressure of 600 mm Hg with the aid of an aspirator. The reaction mixture was added to 800 ml of methanol to precipitate polyleucine which was filtered and dried. A sample of this polymer was dissolved in trifluoroacetic acid and [$\eta$] was measured at 30°C and was found to be 1.50.

A 20 gram amount of the polymer was dissolved in a mixed solvent of 200 g of chloroform and 6 g or formic acid, and a small amount of insoluble material was removed by filtration. The resultant polymer solution was extruded by a quantitative pump through a nozzle containing 20 spinnerets of 0.08 mm diameter into a methylethylketone coagulation bath. The fiber obtained was stretched 1.5 times. This fiber had a tensile strength of 3.2 g/denier and an elongation of 20.2% and had excellent touch and luster.

EXAMPLE 4

A 2 gram quantity of DL-alanyl chloride hydrochloride was heated at 70°C for 24 hours in 20 ml of carbon tetrachloride. The precipitated polyalanine in the reaction mixture was filtered and dried. The yield of polymer was 84.3%. A sample of this polymer was dissolved in trifluoroacetic acid and [$\eta$] was measured at 30°C and was found to be 0.48.

EXAMPLE 5

A 2 gram amount of L-$\alpha$-aminobutyryl chloride hydrochloride was heated at 70°C for 18 hours in 20 ml of a mixed solvent of trichloroethylene and ethyl acetate (mixture ratio = 8/2). The reaction mixture was poured into 50 ml of methanol to precipitate poly-$\alpha$-aminobutyric acid which was filtered and dried. The yield of polymer was 85.6%. This polymer had a viscosity value [$\eta$] of 0.63 at 30°C in trifluoroacetic acid.

EXAMPLE 6

A 10 gram amount of $\gamma$-methyl glutamyl bromide hydrobromide was heated at 100°C for 10 hours in 100 ml of octane. The reaction mixture was poured into 200 ml of methanol to precipitate poly-$\gamma$-methyl glutamate which was filtered and dried. The yield of polymer was 79.4%. This polymer had a viscosity value [$\eta$] of 0.72 at 30°C in trifluoroacetic acid.

EXAMPLE 7

A 3.0 g amount of L-leucyl chloride hydrochloride was suspended in 30 ml of octane in a three-necked flask, and the stirred mixture was heated at the reflux temperature under atmospheric pressure. The heating was continued for 7 hours at the end of which no evolution of hydrogen chloride gas was observed. The reaction mixture was concentrated under reduced pressure to remove octane, and the residue was washed with methanol and then water and dried. By this procedure was obtained 1.7 g of resinous polyleucine which had a viscosity value [$\eta$] of 1.8 at 30°C in trifluoroacetic acid. This polymer was dissolved in hot benzene and concentrated to about a 5% solution. The solution was spread over a glass plate which was dried to remove solvent whereby a transparent film was obtained.

EXAMPLE 8

A 1.5 gram amount of L-phenylalanyl chloride hydrochloride and 1.35 g of L-leucyl chloride hydrochloride were suspended in 30 ml of heptane in a three-necked flask. The stirred suspension was heated at the reflux temperature for 10 hours under atmospheric pressure.

After removal of the heptane from the reaction mixture by concentration, the resultant residue was washed with methanol and then with water and dried. By this procedure was obtained 1.1 g of a copolymer of phenylalanine and leucine. This copolymer had a viscosity value [$\eta$] of 1.0 at 30°C in trifluoroacetic acid. A good film was obtained when it was cast from its solution which was composed of a mixed solvent of chloroform and benzene. The film had a thickness of 25$\mu$, a tensile strength of 3.52 kg/mm$^2$ and an elongation of 25%.

EXAMPLE 9

A 10 gram amount of L-phenylalanyl chloride hydrochloride was suspended in 100 ml of octane in a three-necked flask and then heated at reflux for 8 hours. The reaction mixture was treated in the same manner as described in Example 7 to obtain 6.5 g of polyphenylalanine having a viscosity value [$\eta$] of 0.69 at 30°C in trifluoroacetic acid.

The polymer was dissolved in chloroform and the resulting solution was cast on a glass plate. The film which was removed from the casting surface had a thickness of 22$\mu$, a tensile strength of 3.91 kg/mm$^2$, an elongation of 15% and good feel.

EXAMPLE 10

A 5 gram amount of DL-leucyl chloride hydrochloride was suspended in 100 ml of n-octane and heated under reflux for 4 hours. The reaction mixture was concentrated to dryness under reduced pressure, and the residue was boiled with 100 ml of water and then refluxed with 100 ml of ethanol for 1 hour to remove unreacted acid chloride hydrochloride and a polymer which had a low degree of polymerization. The yield of polyleucine was 3 g ( [$\eta$] = 0.6 at 30°C in trifluoroacetic acid). The polymer was dissolved in tetrachloroethylene and the resulting solution was spread over a glass plate with an applicator having a slit width of 0.7 mm and dried. The film which was removed from the casting surface had a thickness of 15$\mu$, a tensile strength of 2.86 kg/mm$^2$, an elongation of 20% and good touch.

EXAMPLE 11

A 4.3 gram amount of DL-leucyl chloride hydrochloride was suspended in 50 ml of n-heptane and was heated under reflux for 8 hours. The reaction mixture was treated in the same manner as described in Example 7, whereby 2.5 g of polyleucine having a viscosity value [η] of 0.72 at 30°C in trifluoroacetic acid was obtained.

EXAMPLE 12

A mixture of 6.3 g of L-valinyl chloride hydrochloride and 6.7 g of L-leucyl chloride hydrochloride was heated under reflux in 100 ml of n-octane. The reaction mixture was treated in the same manner as described in Example 7 whereby 7.4 g of L-valine-L-leucine copolymer having a viscosity value [η] of 0.50 at 30°C in trifluoroacetic acid was obtained.

The polymer was soluble in benzene and gave a film which had a thickness of 15μ, a tensile strength of 2.65 kg/mm$^2$ and an elongation of 23%.

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. In a process for preparing a polyamino acid by polymerizing an α-amino acid halide salt selected from the group consisting of an α-amino acid chloride hydrochloride and an α-amino acid bromide hydrobromide, the improvement which comprises:
   polymerizing said α-amino acid halide salt in a non-polar organic solvent which contains no active hydrogen atoms in the absence of a base at elevated temperatures such that said polyamino acid is obtained having an intrinsic viscosity above 0.4.

2. The process of claim 1, wherein said non-polar organic solvent has a dielectric constant below 4 at 20°C.

3. The process of claim 2, wherein said non-polar organic solvent is selected from the group consisting of hexane, heptane, octane, benzene, toluene, xylene, carbon tetrachloride, trichloroethylene, 1,1,1-trichloroethane, tetrachloroethylene and mixtures thereof.

4. The process of claim 1, wherein the reaction temperature ranges from 40°C to the boiling point of the non-polar organic solvent.

5. The process of claim 1, wherein the polymerization reaction is conducted under a pressure between 400 mm Hg and atmospheric pressure.

* * * * *